United States Patent [19]

Dawson

[11] 3,918,636
[45] Nov. 11, 1975

[54] DUAL TEMPERATURE CONTROLLER
[75] Inventor: Walter F. Dawson, Duluth, Minn.
[73] Assignee: The United States of America as represented by the United States Environmental Protection Agency, Washington, D.C.
[22] Filed: July 23, 1974
[21] Appl. No.: 491,098

[52] U.S. Cl. .................. 236/78; 165/26; 219/499; 317/148.5 B
[51] Int. Cl.² .................. H01H 47/32; G05D 23/24
[58] Field of Search ........ 317/150, 148.5 B; 165/26, 165/27; 236/78, 20; 219/499

[56] References Cited
UNITED STATES PATENTS

| | | | |
|---|---|---|---|
| 2,645,461 | 7/1953 | Brown et al. | 165/26 |
| 3,029,369 | 4/1962 | Lang et al. | 317/150 |
| 3,516,484 | 6/1970 | Chambers | 165/26 |
| 3,644,755 | 2/1972 | Shaw | 317/148.5 B |
| 3,725,644 | 4/1973 | Bailey | 236/1 C |

*Primary Examiner*—William E. Wayner

[57] ABSTRACT

An apparatus is disclosed for effecting precision control over the temperature of water utilized in laboratory experiments. In its preferred form, the apparatus constitutes a Wheatstone bridge which incorporates a thermistor in one arm and an adjustable resistance in another arm. The thermistor is adapted to be disposed in a body of water, the temperature of which is to be monitored. Through suitable adjustment of the adjustable resistance means, the bridge can be balanced at a given temperature. Upon deviation of the monitored temperature from the given balancing temperature, an output voltage signal is provided, the polarity of which being indicative of the direction of temperature deviation. The output voltage signal is amplified and passed to a relay circuit which includes a diode rectifier such that the circuit is responsive to only one polarity of the amplified output voltage signal. Upon actuation, the relay circuit will serve to generate a trigger signal. A load circuit is provided which constitutes a water temperature controlling apparatus, such as a heater, a solenoid valve or the like, the load circuit further including an energizing semiconductor switch such as a triac which assumes a conductive state to energize the load in response to the trigger signal. Energization of the load circuit effects a thermal change in the body of water. A manually operable switch, such as a double pole double throw switch, is provided for selectively inverting the polarity of the output voltage signal from the Wheatstone bridge so that the temperature controlling load circuit is energized either upon an increase or a decrease in the monitored temperature of the body of water. A plurality of such apparatus can be provided powered from a single DC voltage supply, such that control can simultaneously be effected over a plurality of different bodies of water.

1 Claim, 1 Drawing Figure

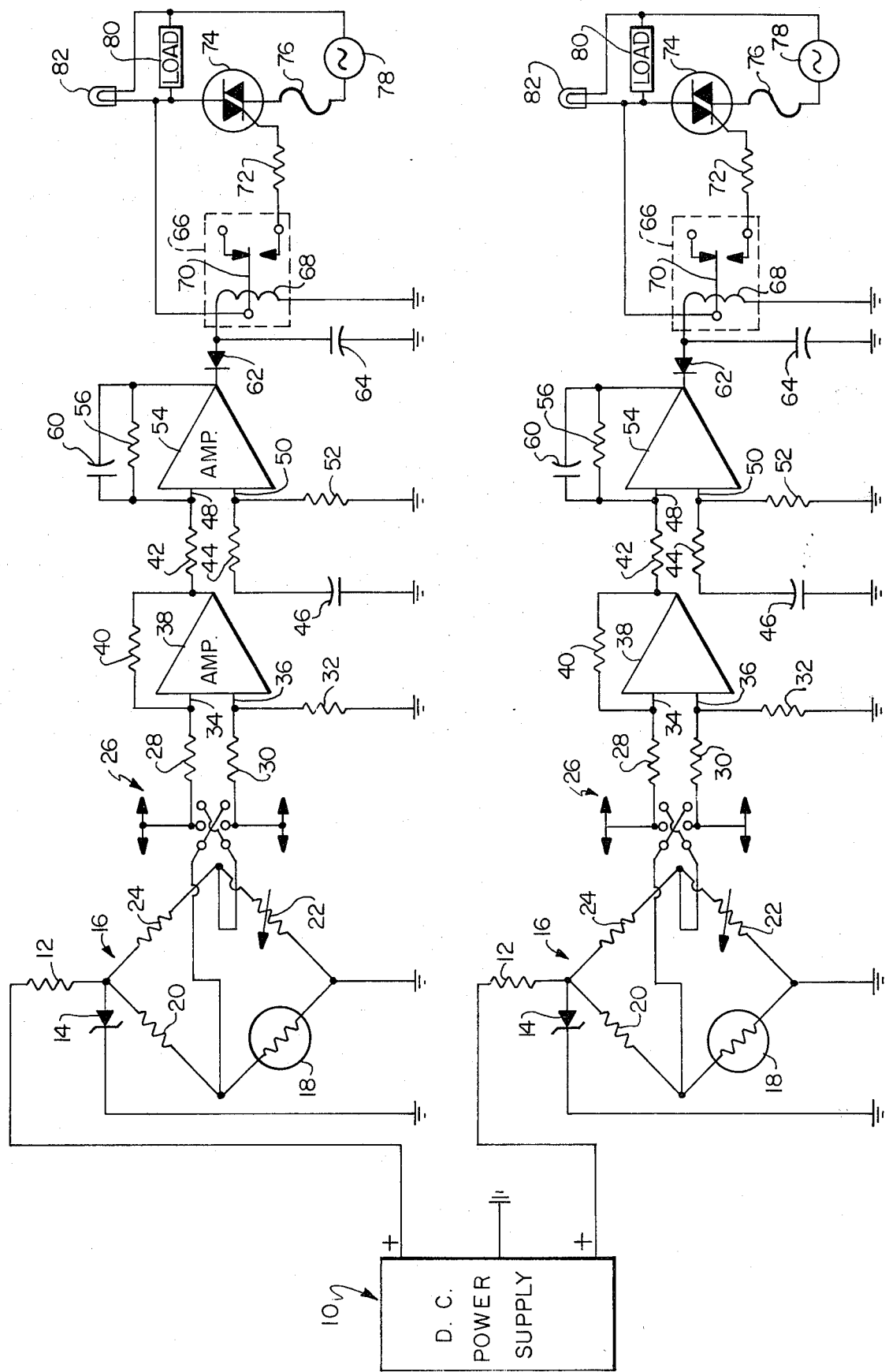

DUAL TEMPERATURE CONTROLLER

BACKGROUND OF THE INVENTION

This invention broadly relates to laboratory equipment and apparatus and is particularly concerned with the provision of an electronic temperature monitoring and control circuit for effecting precision control of the temperature of water utilized in laboratory experiments.

In many laboratory environments, it is absolutely necessary to effect a precise control of the water temperature utilized in water baths and the like. Yet, conventional technology cannot always be applied to this end. For example, the conventional approach calls for the provision of a thermoregulator to monitor the temperature of a body of water with the thermoregulator providing a signal to a switching circuit of electromechanical form to energize water temperature controlling apparatus. Due to the high amperage of the signal needed to actuate typical switching circuits, most of these commercially available devices are wholly unsuitable for use with highly sensitive thermoregulators that are required to maintain precise water temperatures in laboratory experiments.

In an attempt to overcome this known disadvantage, various electronic and switching circuits have been designed which can be utilized with such sensitive thermoregulators. Yet, the most dependable of such electronic relays now available are quite expensive and thus might pose an undue economic burden in some instances. Other less expensive relays have been found to have a tendency towards frequent malfunction.

Difficulties are further presented even as concerns the the thermoregulator elements which are generally of the mercurytungsten type, and are likewise costly, fragile, and cannot easily be installed in some apparatus.

SUMMARY OF THE INVENTION

From the foregoing, it should be apparent that a need still exists in this art for the provision of an improved water temperature controller suitable for utilization in laboratory experiments which is reliable, inexpensive, and compact, thus overcoming the disadvantages of known commercial units. It is the primary objective of the instant invention to provide a temperature controller which satisfies this need.

A further objective of the instant invention concerns the provision of a precision water temperature control apparatus which can easily be constructed utilizing readily available component parts.

Still another objective of the instant invention is to provide a precision water temperature controller which is capable of simultaneously monitoring and controlling the temperatures in a plurality of different bodies of water.

These objects as well as others which will become apparent as the description proceeds are implemented by the subject invention which, as aforestated, constitutes a basic thermoregulator and an electronic switching circuit utilized for actuating a water temperature controlling load, such as a solenoid valve, a heater, or a chiller, the apparatus being provided in a combined form. Specifically, the novel apparatus will be seen to comprise a Wheatstone bridge which incorporates a thermistor in one arm thereof, the thermistor being adapted to be disposed in a body of water the temperature of which is to be monitored. Adjustable resistance means are incorporated in another arm of the bridge for balancing the bridge at a given temperature. The Wheatstone bridge provides an output voltage signal upon a deviation of the monitored temperature from the given balancing temperature. With this arrangement, the polarity of the output voltage signal from the Wheatstone bridge is indicative of the direction of the temperature deviation.

The output voltage signal from the Wheatstone bridge is then amplified and constitutes an input to a relay circuit which is responsive thereto. Upon actuation of the relay circuit, a trigger signal is generated. Importantly, the relay circuit includes a diode rectifier such that the circuit is responsive only to one polarity of the amplified output voltage signal.

A water temperature controlling load circuit is provided which constitutes a solenoid valve, heaters, and/or chillers which, when energized, effects a thermal change in the body of water. Included in the load circuit is an energizing semiconductor switch, such as a triac, which assumes a conductive state in response to the trigger signal. The load circuit can carry high amperage to effect operation of the water temperature controlling load without affecting the temperature monitoring function of the apparatus, in that only low amperage is utilized through the temperature sensing thermistor, the Wheatstone bridge, the amplifier, and the relay switching circuit.

Finally, and so that the apparatus can selectively respond to either an increase or a decrease in the monitored temperature of the body of water, a manually operable switch is provided for selectively inverting the polarity of the output voltage signal from the Wheatstone bridge, the manually operable switch, in the preferred inventive embodiment, taking the form of a double pole double throw electrical switching mechanism.

If the temperatures of a plurality of different bodies of water are desired to be simultaneously monitored and controlled, a plurality of the above-described apparatus would be provided, each apparatus being energized from a single power supply.

BRIEF DESCRIPTION OF THE DRAWINGS

Additional advantages and features of the invention will become apparent from the following detailed description of the preferred embodiment, such description making reference to the appended sheet of drawings, wherein the single FIGURE thereof constitutes an electrical schematic diagram of a dual temperature controller instructed in accordance with the teachings herein.

DETAILED DESCRIPTION OF THE PREFERRED EMBODIMENT

With reference now to the appended drawing, disclosed therein is one form of the inventive apparatus constituting two basic temperature controlling units powered by a single DC power supply 10 effective to simultaneously monitor and control the temperature of several different bodies of water in a laboratory environment. In that each unit is identical in construction, a discussion of the component parts and operation of but one of such units follows for ease of description.

In this respect, a Wheatstone bridge means 16 is provided incorporating a thermistor 18 in one arm thereof, the thermistor 18 being adapted to be disposed in a body of water the temperature of which is to be monitored. An adjustable resistance means 22 is incorporated in another arm of the bridge for balancing the bridge at a given temperature. In typical fashion, biasing resistors 20 and 24 are provided in the other two arms of the Wheatstone bridge. The Wheatstone bridge is energized by power supply 10 through resistor 12, the voltage supplied to the bridge 16 being maintained constant through the provision of a Zener diode 14 disposed across the power supply terminals.

With the arrangement above-discussed, an output voltage signal will appear across the diagonal terminals of the Wheatstone bridge when the resistance of the thermistor 18 varies such as upon a deviation of the monitored temperature from the given balancing temperature. Further, the polarity of the output voltage signal is indicative of the direction of the temperature deviation, i.e. indicative of whether or not the temperature has increased or decreased from the reference point.

A manually operable switch means generally designated by reference numeral 26 is preferably disposed between the output from the Wheatstone bridge means 16 and the first amplifier 38 of an amplifier means constituting the first amplifier 38 as well as a second amplifier 54 so as to insure high gain of the output voltage signal, enabling the utilization of a very low amperage current through the thermistor 18 of the Wheatstone bridge means 16. Switch means 26 preferably constitutes a double pole double throw switch and serves to selectively invert the output voltage signal from the Wheatstone bridge means 16. The purpose of such inversion is to enable the subsequent circuit to operate selectively either upon an increase or a decrease in the temperature monitored by thermistor 18.

The output voltage signal from the Wheatstone bridge means 16 is therefore placed across resistors 28 and 30, constituting the respective input resistance to inputs 34 and 36 of a dual-input integrated amplifier 38 of conventional construction. In typical fashion, the input 34 is coupled to the output of amplifier 38 through a parallel resistor 40, and input 36 is coupled to ground via resistor 32. The output from amplifier 38 is provided to one input 48 of a second amplifier 54 of substantially identical construction through input resistance 42, the other input 50 of amplifier 54 being coupled to ground through resistor 52 and a series circuit constituting resistor 44 and capacitor 46 disposed in parallel with resistor 52, again as is conventional. Input 48 of amplifier 54 is further coupled to the output of such amplifier via a parallel circuit constituting resistor 56 and capacitor 60. In the preferred inventive embodiment, amplifiers 38 and 54 constitute readily available integrated circuits.

The amplified output voltage signal from the Wheatstone bridge means 16 constitutes an input to winding 68 of a relay circuit means 66, winding 68 having a stabilizing capacitor 64 disposed thereacross. Importantly, a diode rectifier 62 is disposed between the output of amplifier 54 and winding 68 such that the winding 68 will be energized only by one polarity of the amplified output voltage signal. Upon energization of winding 68, the relay contact 70 will switch from the position indicated in the drawing into engagement with the lower terminal to which is connected resistor 72. This switching serves to generate a trigger signal which energizes a water temperature controlling load circuit in the fashion to be described.

The water temperature controlling load circuit means includes a load generally designated by reference numeral 80 which constitutes a solenoid valve, a water heater, water chillers or coolers, or the like, load 80 when energized being adapted to effect a thermal change in the body of water the temperature of which is sensed by thermistor 18. Load 80 is contemplated to be driven by an alternating voltage source 78 through a series circuit constituting a fuse 76 and an energizing semiconductor switch means 74 which, in the preferred inventive embodiment, constitutes a triac. Triac 74, in conventional fashion, is placed into a conductive state upon the application of a trigger signal thereto through resistor 72, the trigger signal, of course, being generated by the relay circuit means 66 in that contact 70 thereof is coupled through load 80 to the alternating voltage source 78. Finally, and so as to indicate the energization state of load 80, an indicator light such as neon tube 82 can be provided disposed in a parallel relationship with respect thereto.

In operation, it is to be assumed that triac 74 in the load circuit is initially in a non-conductive state and that the Wheatstone bridge means 16 is balanced and thereby provides no output voltage signal. This condition would be the result of the temperature of the body of water in which thermistor 18 is immersed being at the same temperature as that to which the adjustable resistance 22 is set. Upon a deviation of the monitored temperature from the reference temperature, Wheatstone bridge means 16 would become unbalanced and would generate an output voltage signal of a given polarity, depending upon the direction of the temperature deivation. This output voltage signal would be amplified by means of high gain amplifiers 38 and 54 and would serve to energize winding 68 of the relay 66, thus causing a triggering signal to appear at resistor 72 connected to the triggering input of the triac 74. Triac 74 would thereby be placed into its conductive state, allowing current to flow from source 78 through the water temperature controlling load 80 which, as aforestated, could constitute a solenoid valve controlling the water flow into the body of water, a heater, a water cooler, or the like. As long as the Wheatstone bridge means 16 remained unbalanced, load 80 would remain energized. Upon a rebalancing of the Wheatstone bridge 16, triac 74 would assume a non-conductive state when relay contact 70 dropped-out and returned to the illustrated position, thus deenergizing the load 80. Again, depending upon the setting of the double pole double throw switch 26, the circuit will be caused to respond to either a decrease or an increase in the temperature of the monitored body of water. With the arrangement above-described, only a very low current flows through the thermistor 18 which is in contact with the body of water, whereas a relatively high current to a load 80 is subsequently switched without adverse thermal effects on the monitored body of water. Further, by the utilization of a thermistor in the Wheatstone bridge arrangement, the problem of the fragility of conventional thermal regulators is overcome.

In a relatively simple fashion as depicted in the application drawings, a plurality of such apparatus can be provided to simultaneously monitor and control the temperature of a plurality of different bodies of water in a laboratory environment, each apparatus being connected to a single power supply 10 of purely conventional construction.

It should now be apparent that the objectives initially set forth at the outset of the Specification have been successfully achieved. Moreover, while there has been shown and described a single preferred embodiment, it will be apparent to those skilled in the art that modifications can be made thereto all within the scope of the teachings herein. ACCORDINGLY,

What is claimed is:

1. An apparatus for simultaneously effecting precision control of the temperature of a plurality of different bodies of water utilized in laboratory experiments, said apparatus comprising:

a plurality of Wheatstone bridge means each incorporating a thermistor in one arm thereof adapted to be disposed in a respective different body of water the temperature of which is to be monitored, adjustable resistance means incorporated in another arm of each respective bridge for balancing said respective bridge means at a given temperature, each said Wheatstone bridge means providing zero output voltage when the respective monitored temperature equals the given temperature and for providing a respective output voltage signal upon a deviation of said respective monitored temperature from said given respective balancing temperature, the polarity of each said output voltage signal being indicative of the direction of said respective temperature deviation;

a plurality of amplifier means for amplifying each said respective output voltage signal of each said Wheatstone bridge means;

a plurality of relay circuit means each including a diode rectifier respectively responsive to only one polarity of each said amplified output voltage signal, each said relay circuit means upon actuation generating a trigger signal;

a plurality of water temperature controlling load circuit means each including an energizing semiconductor triac switch means therein which assumes a conductive state in response to said respective trigger signal, each said load circuit means when energized effecting a thermal change in a respective body of water;

a plurality of manually operable double pole double throw switch means for selectively inverting the polarity of each said output voltage signal from each said Wheatstone bridge means, whereby said respective relay circuit means is selectively actuated and said respective load circuit means is energized only upon a selected one of an increase or decrease in the monitored temperature of said respective body of water; and a single d.c. power supply means for all of said Wheatstone bridge means, said amplifier means, and said relay circuit means, said power supply means providing a positive d.c. voltage across each of said Wheatstone bridge means with respect to ground.

* * * * *